United States Patent [19]

Imai et al.

[11] 4,348,041
[45] Sep. 7, 1982

[54] BUTT WELDED TUBULAR STRUCTURE OF AUSTENITE STAINLESS STEEL

[75] Inventors: Katsuyuki Imai; Isao Masaoka; Yochiteru Chiba, all of Hitachi; Masayoshi Kanno, Kitaibaraki, all of Japan; Jiro Kuniya, San Jose, Calif.; Hisao Itow, Hitachi, Japan

[73] Assignee: Hitachi, Ltd., Tokyo, Japan

[21] Appl. No.: 6,216

[22] Filed: Jan. 24, 1979

[30] Foreign Application Priority Data

Jan. 25, 1978 [JP] Japan .................................... 53/6254

[51] Int. Cl.$^3$ .............................................. F16L 13/04
[52] U.S. Cl. .................................... 285/286; 285/41; 285/422; 228/225; 228/189
[58] Field of Search ................ 285/286, 21, 287, 422, 285/46, 41; 228/189, 169, 168, 225, 226

[56] References Cited

U.S. PATENT DOCUMENTS

| | | | |
|---|---|---|---|
| 1,613,461 | 1/1927 | Johnson | 285/286 X |
| 3,774,296 | 11/1973 | Clay | 285/286 |
| 4,049,186 | 9/1977 | Hanneman | 228/225 |
| 4,132,343 | 1/1974 | Kullendorff | 228/168 |

FOREIGN PATENT DOCUMENTS

| | | | |
|---|---|---|---|
| 481509 | 8/1929 | Fed. Rep. of Germany | 285/286 |
| 610824 | 9/1926 | France | 285/286 |
| 279713 | 11/1927 | United Kingdom | 285/286 |

*Primary Examiner*—Dave W. Arola
*Attorney, Agent, or Firm*—Thomas E. Beall, Jr.

[57] ABSTRACT

A butt welded tubular structure composed of tubular members of austenite stainless steel including a restraining member providing a cover to the entire outer circumferential surfaces of a welded joint and heat affected zones of the tubular members, the restraining member being formed of a metal or alloy of lower stress corrosion cracking sensitivity than the material of the tubular members and joined at the entire surfaces of opposite end portions thereof to the tubular members by welding, although the restraining member is not joined to the tubular members at portions of the restraining member corresponding to the welded joint and heat affected zones of the tubular members. The butt welded tubular structure is produced by joining tubular members of austenite stainless steel by butt welding, covering the entire outer circumferential surfaces of the welded joint and heat affected zones of the tubular members with a restraining member formed of a metal or alloy of lower stress corrosion cracking sensitivity than the material of the tubular members, and joining by welding the entire surfaces of opposite end portions of the restraining member to the tubular members while avoiding the joining of the restraining member to the welded joint and heat affected zones of the tubular members at portions of the restraining member corresponding to the welded joint and heat affected zones.

15 Claims, 14 Drawing Figures

BUTT WELDED TUBULAR STRUCTURE OF AUSTENITE STAINLESS STEEL

BACKGROUND OF THE INVENTION

1. Field of the Invention

This invention relates to welded joints of welded tubular structures for use in piping of chemical plants or nuclear power stations, and more particularly to the structure of a welded joint of stainless steel tubular members and a method for producing such structure which best suits the purpose of avoiding the leak of a corrosive medium to outside through cracks formed in the welded joint of tubular members formed of austenite stainless steel tending to develop stress corrosion cracking.

2. Description of the Prior Art

Generally, austenite stainless steel shows precipitation of carbides in the grain boundary when heated to 500° to 800° C. The precipitation of carbides is recognized in members joined by welding although these members are exposed to elevated temperatures for a short period of time. When residual stresses are produced in the heated zones or tensile stresses are applied from outside to the heated zones, such zones will tend to develop stress corrosion cracking in specific corrosion inducing circumstances. The present practice in the art of production of welded tubular structures of austenite stainless steel is to join tubular members of such material by butt welding, and such structures show the tendency to develop stress corrosion cracking. In nuclear power stations where an extraordinary degree of caution is required in the operation of the reactors to prevent accidents, such unstable tubular structures in the piping for connecting various apparatus cannot be left as they stand.

There has in recent years arisen a problem involving the welded joint of tubular members of austenite stainless steel which has attracted a considerable degree of attention, and various measures to solve the problem have been proposed. For example, the piping for connecting apparatus in a nuclear power station is exposed to pure water which is a coolant flowing through the nuclear reactor, and there are possibilities that the aforesaid stress corrosion cracking will be caused by the pure water. More specifically, in a welded tubular structure of austenite stainless steel, tensile residual stresses are produced and welding heat affected zones (hereinafter to be referred to as HAZs) of high stress corrosion cracking sensitivity are formed in the vicinity of the welded joint, thereby presenting a condition in which stress corrosion cracking tends to develop.

As a method for preventing the development of stress corrosion cracking in the welded joint of tubular members of austenite stainless steel under corrosion inducing circumstances, proposals have been made to use a welding process for performing welding while forcedly cooling the interior of the steel tubular members in order to reduce the residual stresses formed in the welded joint and the precipitation of carbides therein. The residual stresses in the weld inside the tubular members are compressive stresses when this welding process is used, so that this process is very effective in reducing the chances of occurrence of stress corrosion cracking in cases where the inner surfaces of the tubular members are exposed to corrosion inducing atmosphere.

However, it is evident that the welded joint formed by welding tubular members while allowing the tubular members to cool by natural cooling tends to develop stress corrosion cracking as aforesaid if no measures are taken for preventing this phenomenon. No effective measures to cope with this situation have yet been established.

In U.S. Pat. No. 4,049,186 to Hanneman et al., there is shown a proposal to perform overlay welding on the butt welded joint and its vicinity of tubular members of austenite stainless steel on part of or the entire outer surfaces of the tubular members. In this welding process, it requires a lot of labor to perform overlay welding on the entire outer surfaces of the tubular members. However, when overlay welding is performed on part of the outer surfaces, the problem arises of stress corrosion cracking occurring in portions where no overlay welding is performed. Moreover, in this welding process, it is essential to avoid the use of materials which will have unfavorable influences on the tubular members in performing welding because overlay welding is performed directly on the tubular members. Thus, limitations are placed on the welding materials that can be used because a material used must be such that it enables overlay welding suitable for steel tubular members to be effected.

SUMMARY OF THE INVENTION

(1) Object of the Invention

This invention has as its object the provision of a welded tubular structure and a method for producing such structures, the welded tubular structure having the effect of preventing stress corrosion cracking from developing in the butt welded joint of tubular members of austenite stainless steel and hence preventing the leak of corrosive medium from the welded joint to outside.

(2) Statement of the Invention

One of the features of this invention is that in a butt welded tubular structure composed of tubular members of austenite stainless steel, the entire outer circumferential surfaces of a welded joint and HAZs of the tubular members are covered with a restraining member formed of a metal or alloy of lower stress corrosion cracking sensitivity than the material of the tubular members, and the restraining member is joined by welding at the entire surfaces of opposite end portions thereof to the tubular members, although the restraining member is not joined at portions thereof corresponding to the butt welded joint and HAZs to the tubular members.

Generally, the HAZs tend to develop cracks in welding. Therefore, by covering these zones, it is possible to prevent a corrosive medium from leaking to outside even if cracks are formed in the HAZs. Also, by using a restraining member of the metal or alloy of the type described, it is possible to prevent the leak of the corrosive medium by the restraining member, should the HAZs develop cracking. It is for the purpose of preventing the corrosive medium from leaking to outside that the restraining member is joined at the entire surfaces of its opposite end portions to the tubular members. The aforesaid metal or alloy is required to have higher resistance to stress corrosion cracking than the material of the tubular members, and it is preferable that such metal or alloy is more resistant to corrosion itself than the material of the tubular members. In providing a restraining member, a pipe is split into a plurality of segmental members which are connected together axially of the tubular members to provide a pipe which in turn is connected at opposite end portions thereof to the tubular members. Alternatively, a pipe conforming to the butt welded joint of tubular members is inserted beforehand in the tubular members and connected to the tubular members after the latter are joined by butt welding. The thickness of the restraining member should be at least equal to the thickness of the tubular members if the restraining members is to be effective, and is preferably less than twice the thickness of the tubular members. The restraining member should have a width which is twice to three times that of the welded joint formed in the tubular members.

In preventing stress corrosion cracking, it is advisable to use, as the aforesaid metal or alloy, austenite stainless steel of lower carbon content than the tubular members or stabilized austenite stainless steel containing elements forming stable carbides and not tending to form the carbide of chromium by the heat of welding. The aforesaid stainless steels are lower in stress corrosion cracking sensitivity than the material of the tubular members.

In welding the restraining member at opposite end portions thereof to the tubular members, it is advisable to perform welding by using low carbon austenite stainless steel of lower carbon content than the material of the tubular members or the aforesaid stabilized steel, in order to prevent stress corrosion cracking. The low carbon austenite stainless steel preferably contains up to 0.4 weight percent carbon. AISI308L is a desirable material.

Another feature of the invention is that prior to providing a restraining member to the welded tubular structure, deposited metal is placed on the entire outer circumferential surfaces of portions of the tubular members adjacent and in the vicinity of the butt welded joint and HAZ of the tubular members or on the entire outer circumferential surfaces of the welded joint and portions of the tubular members adjacent the welded joint, the deposited metal comprising a metal or alloy of lower stress corrosion cracking sensitivity than the material of the tubular members. By this dual protection, the restraining member and the deposited metal can increase the safety of the welded tubular structure. The metal or alloy used as deposited metal is the same metal or alloy as is used for welding the opposite end portions of the restraining member to the tubular members. In this welded tubular structure, restraining member may be joined by welding to the outer circumferential surface of the deposited metal or the outer circumferential surfaces of the tubular members including the deposited metal.

Another feature of the invention is that the welding of the opposite ends of a restraining member is performed while cooling the inner surfaces of the tubular members by directly bringing a cooling medium into direct contact therewith. By this feature, the HAZs of the tubular members can have their width reduced, thereby increasing the safety of the welded tubular structure. Water is preferred as a cooling medium. Cooling may be performed either by passing water directly into the bores of the tubular members or by using a suitable jig to bring water into contact with the welded joint.

Still another feature of the invention is that in placing deposited metal on the outer circumferential surfaces of the tubular members, deposited metal is welded while bringing a cooling medium into direct contact with the inner surfaces of the tubular members. By placing deposited metal by this welding process, it is possible to cause compressive stresses to be applied as residual stresses to the HAZs on the inner surfaces of the tubular members, thereby preventing the development of stress corrosion cracking in the welded joint.

A still another feature of the invention is that in joining by welding the entire surfaces of the end portions of a restraining member to the outer circumferential surfaces of the tubular members or the outer circumferential surface of the deposited metal, welding is performed by increasing the temperature of the restraining member above that of the tubular members. By this arrangement, thermal contraction is produced after welding and compressive residual stresses are applied to the welded joint of the tubular members and the HAZs on the inner surfaces of the tubular members, thereby preventing stress corrosion cracking. The restraining member is preferably heated to the range between 300° and 400° C. In place of heating, the restraining member may be split into two portions disposed axially of the tubular members and the final welding may be performed on the split surfaces. In this manner, the same effect can be achieved in producing contraction as heating.

A further feature of the invention is that a restraining member of a dual construction is used, the restraining member being composed of an inner portion facing the outer circumferential surfaces of the tubular members and formed of a metal or alloy more unlikely to develop stress corrosion cracking than the material of the tubular members, and an outer portion formed of a metal or alloy having a lower coefficient of thermal expansion than the material of the tubular members. By using the restraining member of the aforesaid dual construction, it is possible to restrain the welded joint of a welded tubular structure that handles fluid of high temperature, and compressive stresses are applied, thereby minimizing stress corrosion cracking. The metal or alloy of low stress corrosion cracking sensitivity is as aforesaid. As a metal or alloy of lower coefficient of thermal expansion than the material of the tubular structure, soft steel, low alloy steel or ferrite stainless steel may be used. When soft steel or low alloy steel is used, overlay welding of austenite stainless steel is preferably performed on opposite end portions.

DESCRIPTION OF THE EMBODIMENTS

Figure 1:
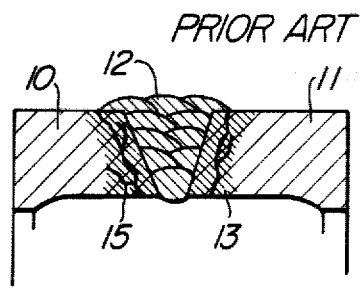
FIG. 1 is a schematic sectional view of a welded structure of the prior art.

Before describing in detail the embodiments of this invention, a butt welded tubular structure of the prior art will be outlined to enable the invention to be clearly understood. FIG. 1 is a schematic sectional view of a welded joint of tubular members joined by a conventional welding process by permitting the tubular members to cool by the natural process. The welded tubular structure is composed of tubular members of AISI304 and was subjected to stress corrosion cracking tests as a control. In the figure, 10 and 11 designate stainless steel tubular members, 12 designates a butt welded joint, 13 designates heat affected zones (HAZs), and 15 designates cracks. The results of the tests show that tensile residual stresses of about 30 kg/mm$^2$ were applied to inner and outer surfaces of the stainless tubular members as the result of welding effected by adopting the natural cooling process, and when the welded structure was immersed in a boiling aqueous solution of 42% magnesium chloride for 20 hours, cracks were formed which penetrated the HAZs. The HAZs each had a width of about 15 mm.

Figure 2:
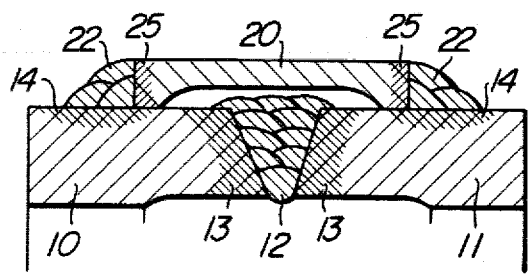
FIG. 2 is a schematic sectional view of the welded structure comprising an embodiment of this invention.

Embodiments of the invention will now be described by referring to the drawings, in which FIG. 2 is a schematic sectional view of the butt welded joint of tubular members of austenite stainless steel which will be described as Example 1.

EXAMPLE 1

Figure 4:
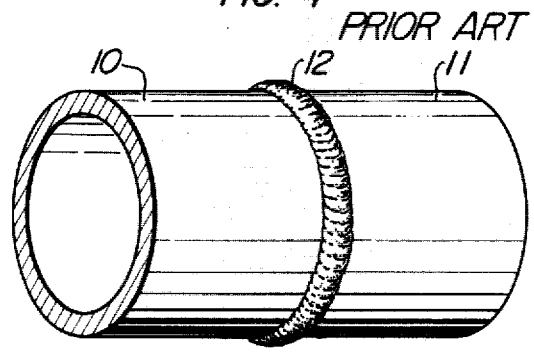
FIG. 4 is a perspective view of a butt welded tubular structure of the prior art.
Figure 5:
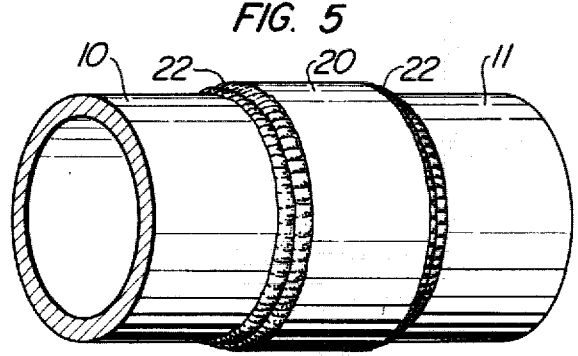
FIG. 5 is a perspective view of the butt welded tubular structure according to the invention.

The tubular members 10 and 11 (outer diameter, 114 mm; and thickness, 8.6 mm) of AISI304-4B was joined by butt welding by cooling in the natural cooling process as shown in FIG. 4 to provide a butt welded tubular structure according to the invention shown in FIG. 5. Tests were conducted on this structure in which the structure was immersed in a boiling aqueous solution of 42% magnesium chloride for 20 hours. Test pieces were provided with a coating of a silicone base heat resisting paint in portions thereof other than the inner surfaces of the tubular members, so that only the inner surfaces of the tubular members will be brought into contact with the corrosive solution. The butt welding was performed in 6-pass, using a 308L welding electrode. The deposition of initial layers was carried out by inserting an insert ring of 308L. The HAZs of the butt welding each had a width of about 10 mm. The tubular members 10 and 11 were joined by butt welding, and the butt welded tubular structure was inserted in a restraining member 20 which was a pipe of AISI304L containing up to 0.03 weight percent carbon. The restraining member 20 was welded at opposite ends thereof to the welded tubular structure by the following four processes: (1) welding carried out while cooling was effected by the natural cooling process, (2) welding carried out by directly passing water through the tubular members, (3) welding carried out by effecting cooling by the natural cooling process while maintaining the restraining member at about 300° C. after the butt welded tubular structure was inserted in the restraining member heated to about 300° C. prior to the insertion of the welded tubular structure, and (4) welding similar to (3) but effecting cooling by directly passing water through the welded tubular structure. The restraining member 20 had a thickness of 10 mm and a width of 40 mm. The restraining member 20 was spaced apart from the welded joint of the tubular members about 0.3 mm. In welding the restraining member 20, the electrode 308L (carbon content, 0.02 weight percent) of 1.6 mm in diameter was used. 12 designates a butt welded joint, 13 designates HAZs formed adjacent the butt welded joint 12, 14 designates HAZs formed in the tubular members 10 and 11 when the restraining member 20 was welded at 22 thereto, and 25 designates HAZs formed in the restraining member 20.

Stress corrosion cracking tests were carried out on the butt welded structures produced by the aforesaid four welding methods. The results of the tests show that crack formation occurred in none of the structures. Cracking tests were carried out on welded structures produced by a butt welding process of the prior art. The results show that cracks were formed in the welded joint, although no penetrating cracks were formed. The butt welded tubular structure had a restraining member welded thereto by the welding method of (2) according to the invention, and the product was subjected to similar cracking tests. The results show that no development occurred in the cracks. The welded structures produced by welding carried out while cooling was effected by directly passing water had a higher resistance to cracking than the welded structure produced by welding carried out while cooling was effected by the natural cooling process.

Figure 3:
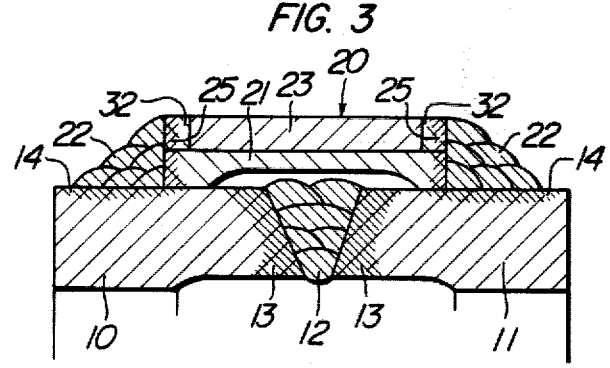
FIG. 3 is a schematic sectional view of a modification of the welded structure shown in FIG. 2, in which the restraining member is of the dual construction.

FIG. 3 is a schematic sectional view of the butt welded structure according to the invention, which will be described as example 2.

EXAMPLE 2

The tubular members 10 and 11 were joined by butt welding under the same conditions as in Example 1, and the restraining member 20 which was of the dual construction, was welded to the butt welded tubular structure at 22 by the same four welding methods as described by referring to Example 1. The products were subjected to stress corrosion cracking tests under the same conditions as described by referring to Example 1. The restraining member 20 had an inner portion 21 facing the tubular structure in the form of a steel pipe of 304L containing less than 0.03 weight percent carbon, and an outer portion 23 in the form of a pipe of carbon steel of 0.3% carbon content. The restraining member 20 had a width of 40 mm and each of the inner and outer portions had a thickness of 4 mm. The inner and outer portions 21 and 23 were welded together at 32 as shown by using a welding electrode of 308L. The material (304L) of the restraining member 20 in contact with the surface of 304 steel tubular members was machined about 1 mm as shown. 25 designates HAZs formed in the restraining member 20. The mean coefficient of thermal expansion of the aforesaid carbon steel is $11.4 \times 10^{-6}$ and that of 304 steel pipe is $17.1 \times 10^{-6}$ at 20°–100° C.

The welded tubular structure produced by the aforesaid four welding methods showed no stress corrosion cracking at all. As in Example 1, the welded structure produced by a butt welding process of the prior art was exposed to a corrosive agent to form cracks in the welded joint, and the restraining member was welded to the cracked welded structure in the same construction as shown in FIG. 3 and by using the welding method described in (2) above. The results of tests conducted on this product show that the cracks already formed in the welded joint showed no development or aggravation.

The use of the restraining member of the dual construction enabled better results to be achieved than the use of the restraining member described in Example 1 in resisting crack formation. Also, the welded tubular structure according to the invention showed a higher resistance to crack formation when welding was carried out while effecting cooling by directly passing water through the tubular members to be joined than when welding was carried out while cooling was effected by the natural cooling process.

FIGS. 6 to 11 show embodiments of the invention in which deposited metal is placed on the tubular members to be joined. These embodiments will be described as Example 3.

EXAMPLE 3

Figure 6:
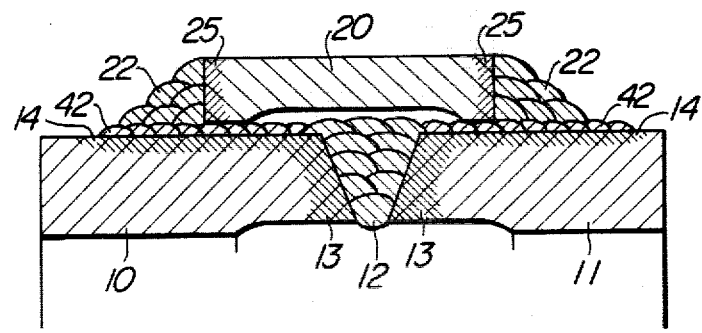
FIGS. 6 and 7 are schematic sectional views of the welded structures according to the invention, in which deposited metal is placed by overlay welding in the vicinity of the butt welded joint.
Figure 7:
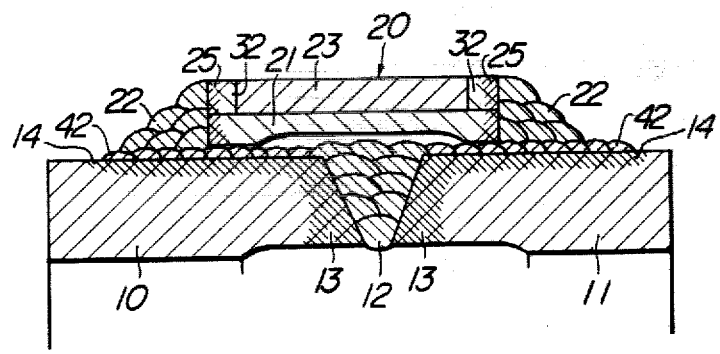
Figure 8:
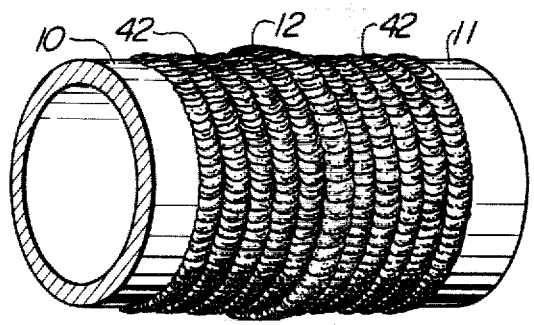
FIGS. 8 and 9 are perspective views of the butt welded tubular structures according to the invention, in which deposited metal is placed by overlay welding.
Figure 9:
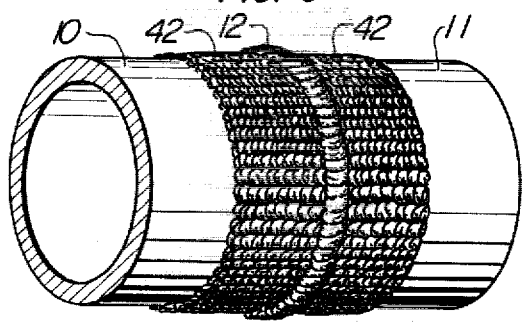

The restraining member 20 shown in FIG. 6 is formed of a metal or alloy which has a higher resistance to the development of stress corrosion cracking than the material of the tubular members 10 and 11, and the restraining member shown in FIG. 7 is of the dual construction shown in FIG. 3 and described in Example 2. In each of the butt welded tubular structures shown in FIGS. 6 and 7, a deposited metal 42 was placed on surfaces of the tubular members 10 and 11 excepting the welded joint 12 by overlay welding, prior to the welding of the restraining member 20 to the tubular members 10 and 11. By using a welding electrode of 308L, the deposited metal 42 was placed circumferentially of the welded tubular structure as shown in FIG. 8 and axially thereof as shown in FIG. 9, to form a layer of deposited metal 42. The welded metal 42 in a strip of about 20 mm in width was successively placed axially of the welded tubular structure on opposite sides of the welded joint 12. In welding the deposited metal 42, cooling water was directly passed through the tubular members 10 and 11. Following the formation of the layer of deposited metal 42 as shown in FIGS. 8 and 9, the restraining member 20 of 40 mm in width was applied to the welded tubular structure by the four welding methods described in Example 1, so that the restraining member will be located on the layer of deposited metal 42.

Figure 10:
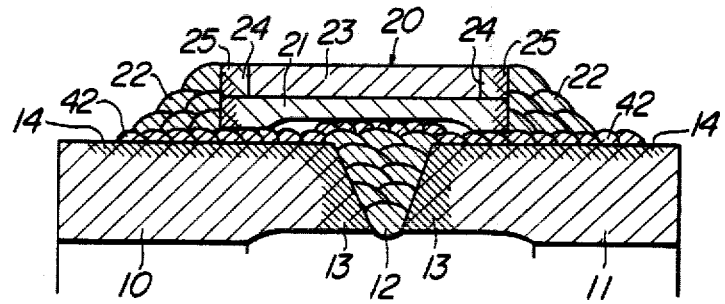
FIGS. 10 and 11 are schematic sectional views of the welded structures according to the invention, in which deposited metal is placed on the welded joint and the vicinity of the welded joint.
Figure 11:
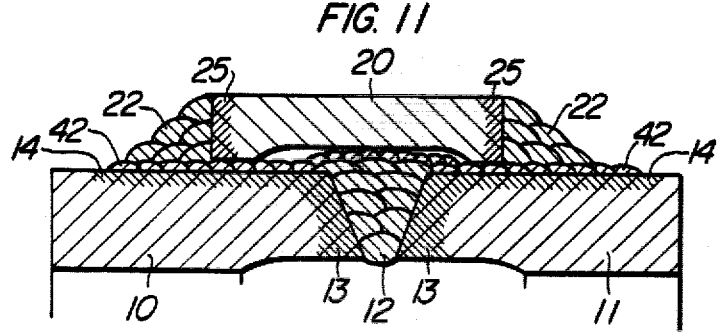

FIGS. 10 and 11 are sectional views of welded tubular structures in which the deposited metal 42 was placed by overlay welding not only on the surfaces of the tubular members 10 and 11 but also on the welded joint 12 according to the invention. In forming the layer of deposited metal, the welding electrode of 308L was used to successively place the deposited metal 42 in a strip of about 20 mm in width axially of the welded structure while passing cooling water therethrough, as described by referring to the preceding examples. Thereafter, the restraining member 20 was welded to the layer of the deposited metal 42 on the tubular members 10 and 11 by the four welding methods described in Example 1.

Stress corrosion cracking tests were carried out on the welded tubular structures produced by combining various welding methods and various forms of welded structures, in the same manner as described in Example 1. The results of the tests show that no crack formation occurred in all the welded structures tested.

The restraining member 20 of the dual construction shown in FIGS. 7 and 10 was applied to butt welded tubular structures produced by a welding method of the prior art and exposed to a corrosive agent to form cracks in the HAZs, with the restraining member 20 being welded to the tubular structures while effecting cooling by passing water through the tubular structures. The products were subjected to similar stress corrosion cracking tests. The results of the tests show that the cracks already formed showed no development or aggravation.

It has been ascertained that the butt welded tubular structure according to the invention which has a deposited metal layer has a higher resistance to crack formation than the structures described with reference to Examples 1 and 2, and that the structure in which welding was carried out while effecting cooling by passing water through the tubular members has a higher resistance to crack formation than the structure in which welding was carried out while effecting cooling by the natural process.

Figure 12:
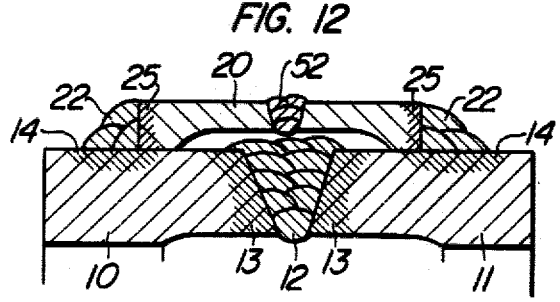
FIGS. 12, 13 and 14 are schematic sectional views of the welded structures according to the invention, in which the restraining member is in the form of a steel pipe split into two portions arranged axially of the tubular members.
Figure 13:
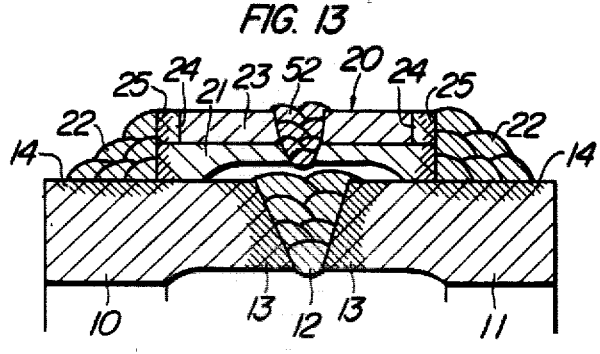

FIGS. 12 and 13 show embodiments of the invention in which the restraining member 20 is split into two portions arranged axially of the tubular members 10 and 11. These embodiments will be described as Example 4.

EXAMPLE 4

The butt welding of the tubular members 10 and 11 were carried out under the same conditions as in Example 1. Then, the two portions of the restraining member 20 were welded at one end thereof to the tubular members 10 and 11 at 22 while passing water directly through therethrough. Finally, the two portions of the restraining member 20 were welded together at the other end thereof at 52 while effecting cooling by the natural cooling process. When the two portions of the restraining members 20 were welded together while effecting cooling by the natural cooling process, contraction occurred after the two portions were joined by welding, thereby having effect in applying residual compressive stresses to the weld on the inner surfaces of the tubular members. Welding of the two portions of the restraining member 20 was carried out by using a welding electrode of 308L. The restraining member 20 shown in FIG. 13 is of the dual construction similar to the one described in Example 2. The restraining member 20 shown in FIG. 2 is formed of 304L.

The butt welded tubular structures shown in FIGS. 12 and 13 were subjected to stress corrosion cracking tests under the same conditions as described in Example 1. The results of the tests show that crack formation occurred in none of the structures.

Figure 14:
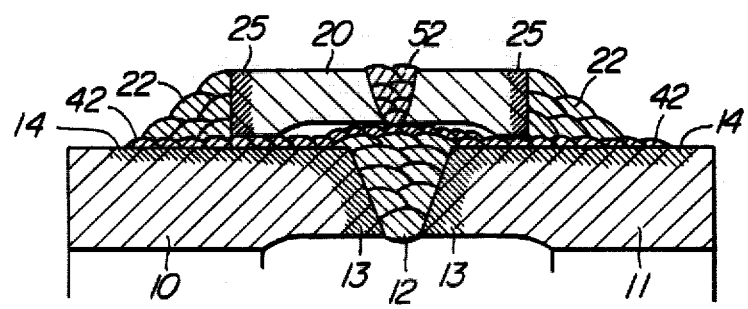

FIG. 14 shows an embodiment of the present invention and, therefore, having the advantages thereof which is constructed in the same manner as the embodiment of FIG. 11, except that the restraining member 20 is split into two portions arranged axially of the tubular members 10 and 11, and welded as in the embodiment of FIG. 12.

From the foregoing description, it will be appreciated that the present invention can readily reinforce the butt welded joint of stainless steel tubular members formed by a conventional method in a butt welded tubular structure of austenite stainless steel which is exposed to a corrosive action on the inner surfaces of the tubular members, and is highly effective in preventing the occurrence of crack formation. As compared with welding process described in U.S. Pat. No. 4,049,186 to Hanneman et al., the present invention offers advantages in that welding can be performed in less time with less labor to achieve the same resistance to stress corrosion cracking, and that any metal or alloy can be used as a restraining member so long as the material is low in stress corrosion cracking sensitivity. In addition, since the restraining member according to the invention can be indirectly welded to the tubular members constituting a welded tubular structure, the use of the restraining member can have wide application. Also, the stresses produced by the restraining member according to the invention can be made to act effectively on the HAZs of the butt welded joint of the tubular members.

What is claimed is:

1. A butt welded tubular structure for use with nuclear reactors, comprising:
   two tubular members of austenite stainless steel butt welded together at their adjacent ends to form a welded joint and weld heat affected zones immediately adjacent said welded joint; and
   an imperforate restraining member providing a cover to said welded joint and adjacent heat affected zones of said tubular members in a manner to substantially form a clearance between the restraining member and the tubular members, said restraining member being formed of a metal of lower stress corrosion cracking sensitivity than the material of said tubular members, said restraining member being welded at the entire surfaces of opposite end portions thereof to said tubular members, said restraining member being spaced from said welded joint and said heat affected zones to form an annular chamber between said restraining member and said welded joint and the heat affected zones of the tubular members.

2. A butt welded tubular structure, comprising:
   two tubular members of austenite stainless steel butt welded together at their adjacent ends to form a welded joint and weld heat affected zones immediately adjacent said welded joint;
   a layer of deposited metal formed on the entire outer circumferential surfaces of portions of said tubular members adjacent and in the vicinity of said welded joint and heat affected zones of said tubular members substantially covering said heat affected zones, said deposited metal comprising a metal of lower stress corrosion cracking sensitivity than the material of said tubular members; and
   a restraining member providing a cover to the entire outer circumferential surfaces of said welded joint of said tubular members in a manner to substantially form a clearance between the restraining member and the adjacent outer circumferential surfaces, said restraining member being formed of a metal of lower stress corrosion sensitivity than the material of said tubular members, said restraining member being welded at the entire surfaces of opposite end portions thereof to the outer circumferential surface of said layer of deposited metal, said restraining member being spaced from said welded joint and said deposited metal to form an annular chamber between said restraining member and said welded joint, deposited metal and heat affected zones of the tubular members.

3. A butt welded tubular structure as set forth in claim 2, wherein said restraining member is jointed at the entire surfaces of the opposite end portions thereof to the outer circumferential surface of said layer of deposited metal by welding performed while said restraining member is maintained at a higher temperature than said tubular members so that said restraining member is under tension and said weld joint and the adjacent portions of said tubular members are compressed when said tubular structure is at substantially the same temperature after welding and cooling.

4. A butt welded tubular structure as set forth in claim 2, wherein said restraining member is of a dual construction and includes an inner portion facing said outer circumferential surfaces of said tubular members and formed of a metal of lower stress corrosion cracking sensitivity than the material of said tubular members, and an outer portion separate from said inner portion, remote from said tubular members and formed of a metal or alloy having a lower coefficient of thermal expansion than the material of said tubular members both said inner portion and said outer portion of said restraining member being welded at the entire surfaces of opposite end portions thereof to said tubular members.

5. A butt welded tubular structure as set forth in claim 2, wherein said restraining member is split into two portions arranged axially of said tubular members, said two portions of said restraining member being joined at the entire surfaces of opposite end portions thereof, which are not juxtaposed against each other, to said tubular members by welding and then joined at the split end surfaces by welding, said restraining member being spaced from said tubular members at portions of the restraining member corresponding to the welded joint and the heat affected zones of the tubular members.

6. A butt welded tubular structure, comprising:
   two tubular members of austenite stainless steel butt welded together at their adjacent ends to form a welded joint and weld heat affected zones immediately adjacent said welded joint; and
   a restraining member providing a cover to said welded joint and heat affected zones of said tubular members in a manner to substantially form a clearance between the restraining member and the tubular members, said restraining member being formed of a metal of lower stress corrosion cracking sensitivity than the material of said tubular members, said restraining member being joined at the entire surfaces of opposite end portions thereof to said tubular members by welding performed while effecting cooling by directly bringing a cooling medium into contact with inner surfaces of said tubular members so that said tubular members and welded joint between the opposed end portions of said restraining member will be compressed and said restraining member will be under tension when said tubular structure is at substantially the same temperature after welding and cooling, said restraining member being spaced from said welded joint and said heat affected zones to form an annular chamber between said restraining member and said welded joint and heat affected zones of said tubular members.

7. A butt welded tubular structure as set forth in claim 6, wherein said restraining member is of a dual construction and includes an inner portion facing said outer circumferential surfaces of said tubular members and formed of a metal of lower stress corrosion cracking sensitivity than the material of said tubular members, and an outer portion separate from said inner portions remote from said tubular members and formed of a metal having a lower coefficient of thermal expansion than the material of said tubular members both said inner portion and said outer portion of said restraining member being welded at the entire surfaces of opposite end portions thereof to said tubular members.

8. A butt welded tubular structure as set forth in claim 6, wherein said restraining member is split into two portions arranged axially of said tubular members, said two portions of said restraining member being joined at the entire surfaces of opposite end portions thereof, which are not juxtaposed against each other, to said tubular members by welding and then joined at the split end surfaces by welding, said restraining member being spaced from said tubular members at portions of the restraining member corresponding to the welded joint and the heat affected zones of the tubular members.

9. A butt welded tubular structure, comprising:
two tubular members of austenite stainless steel butt welded together at their adjacent ends to form a welded joint and weld heat affected zones immediately adjacent said welded joint;
a layer of deposited metal formed on the entire outer circumferential surfaces of at least said heat affected zones of said tubular members adjacent said welded joint, said deposited metal comprising a metal of lower stress corrosion cracking sensitivity than the material of said tubular members, said deposited metal being welded while effecting cooling by directly bringing a cooling medium into contact with the inner surfaces of said tubular members so that said deposited metal is tensioned and said welded joint is compressed when said tubular structure is at substantially the same temperature after welding and cooling; and
a restraining member providing a cover to the entire outer circumferential surface of said welded joint and said heat affected zones of said tubular members in a manner to substantially form a clearance between the restraining member and the tubular members, said restraining member being formed of a metal of lower stress corrosion cracking sensitivity than the material of said tubular members, said restraining member being joined to the outer circumferential surface of one of said layer of deposited metal and said outer circumferential surfaces of said tubular members by welding performed while effecting cooling by directly bringing a cooling medium into contact with inner surfaces of said tubular members so that said weld joint is compressed and said restraining member is under tension when said tubular structure is at substantially the same temperature after welding and cooling, said restraining member being spaced from said welded joint and said deposited metal in the vicinity of said heat affected zones so as to form an annular chamber between said restraining member and said welded joint, deposited metal and heat affected zones of said tubular members.

10. A butt welded tubular structure as set forth in claim 9, wherein said restraining member is joined at the entire surfaces of the opposite end portions thereof to the outer circumferential surfaces of said tubular members or the outer circumferential surface of said layer of deposited metal by welding performed while maintaining said restraining member at a higher temperature than said tubular members so that said restraining member is under tension and the welded joint and adjacent portions of said tubular members are compressed.

11. A butt welded tubular structure as set forth in claim 9, wherein said restraining member is of a dual construction and includes an inner portion facing said outer circumferential surfaces of said tubular members and formed of a metal of lower stress corrosion cracking sensitivity than the material of said tubular members, and an outer portion separate from said inner portion, remote from said tubular members and formed of a metal having a lower coefficient of thermal expansion than the material of said tubular members both said inner portion and said outer portion of said restraining member being welded at the entire surfaces of opposite end portions thereof to said tubular members.

12. A butt welded tubular structure as set forth in claim 9, wherein said restraining member is split into two portions arranged axially of said tubular members, said two portions of said restraining member being joined at the entire surfaces of opposite end portions thereof, which are not juxtaposed against each other, to the outer circumferential surfaces of one of said tubular members and said outer circumferential surface of said layer of deposited metal by welding and also joined at the split end surfaces by welding.

13. A butt welded tubular structure, comprising:
two tubular members of austenite stainless steel butt welded together at their adjacent ends to form a welded joint and weld heat affected zones immediately adjacent said welded joint; and
a restraining member providing a cover to the entire outer circumferential surfaces of said welded joint and said heat affected zones of said tubular members in a manner to substantially form a clearance between the restraining member and the tubular members, said restraining member being formed of a metal of lower stress corrosion cracking sensitivity than the material of said tubular members, said restraining member being joined at entire surfaces of opposite end portions thereof to said tubular members by welding performed while maintaining said restraining member at a higher temperature than said tubular members so that said restraining member is under tension and the adjacent portions of said tubular members are compressed when said tubular structure is at substantially the same temperature after welding and cooling, said restraining member being spaced from said welded joint and said heat affected zones to form an annular chamber between said restraining member and said welded joint and heat affected zones of the tubular members.

14. A butt welded structure, comprising:
two tubular members of austenite stainless steel butt welded together at their adjacent ends to form a welded joint and weld heat affected zones immediately adjacent said welded joint; and
a restraining member providing a cover to the entire outer circumferential surfaces of said welded joint and heat affected zones of said tubular members, said restraining member being of a dual construction and including an inner portion facing said tubular members and formed of a metal of lower stress corrosion cracking sensitivity than the material of said tubular members, and an outer portion separate from said inner portion, remote from said tubular members and formed of a metal having a lower coefficient of thermal expansion than the material of said tubular members, both said inner portion and outer portion of said restraining member being joined at the entire surfaces of opposite end portions thereof to said tubular members by welding in a manner to substantially form a clearance between the restraining member and the tubular members so that the restraining member is spaced from said welded joint and said heat affected zones to form an annular chamber between said restraining member and said welded joint and heat affected zones of the tubular members.

15. A butt welded tubular structure, comprising:
two tubular members of stainless steel butt welded together at their adjacent ends to form a welded joint and weld heat affected zones immediately adjacent said welded joint; and
a restraining member providing a cover to the entire outer circumferential surfaces of said welded joint and heat affected zones of said tubular members in a manner to substantially form a clearance between the restraining member and the tubular members, said restraining member being formed of a metal of lower stress corrosion cracking sensitivity than the material of said tubular members and split into two portions arranged axially of said tubular members, said two portions of said restraining member being joined at the entire surfaces of opposite end portions thereof, which are not juxtaposed against each other, to said tubular members by welding and then joined at the split end surfaces thereof by welding, said restraining member being spaced from said welded joint and said heat affected zones to form an annular chamber between said restraining member and said welded joint and heat affected zones of the tubular members.

* * * * *